(12) United States Patent
Vichinsky

(10) Patent No.: US 7,827,973 B2
(45) Date of Patent: Nov. 9, 2010

(54) INTEGRATED POSITIVE CRANKCASE VENTILATION CHANNEL

(75) Inventor: Kevin Vichinsky, Portage, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 71 days.

(21) Appl. No.: 11/924,089

(22) Filed: Oct. 25, 2007

(65) Prior Publication Data

US 2008/0099001 A1   May 1, 2008

Related U.S. Application Data

(60) Provisional application No. 60/854,729, filed on Oct. 27, 2006.

(51) Int. Cl.
F02M 25/07 (2006.01)

(52) U.S. Cl. .................................. 123/572; 123/184.24

(58) Field of Classification Search ......... 123/572–574, 123/41.85, 184.24, 184.34, 184.42, 184.47, 123/41.86
See application file for complete search history.

(56) References Cited

U.S. PATENT DOCUMENTS

| | | | |
|---|---|---|---|
| 5,826,553 A * | 10/1998 | Nakayama et al. | 123/184.42 |
| 6,807,957 B2 | 10/2004 | Ko | |
| 6,886,532 B2 * | 5/2005 | Nohara et al. | 123/401 |
| 7,017,562 B2 * | 3/2006 | Jeon | 123/572 |
| 7,032,556 B2 * | 4/2006 | Nakamura | 123/184.24 |
| 7,296,563 B2 * | 11/2007 | Yakabe et al. | 123/568.17 |

* cited by examiner

Primary Examiner—M. McMahon

(57) ABSTRACT

An integrated positive crankcase ventilation (PCV) channel is formed along a structural weld line between two shell components that are welded together to form an air intake manifold. The integrated PCV channel can be used to uniformly distribute blow-by gases from the crankcase of an internal combustion engine to a plurality of combustion chambers via the air intake manifold.

18 Claims, 3 Drawing Sheets

INTEGRATED POSITIVE CRANKCASE VENTILATION CHANNEL

BACKGROUND OF THE INVENTION

1. Field of Invention

The invention relates to a positive crankcase ventilation (PCV) system for an internal combustion engine.

2. Description of Related Art

During the operation of reciprocating engines such as internal combustion engines and compressors, small volumes of gaseous media may be forced past sealing rings into the crankcase. This gaseous media, which is also called blow-by gas, can comprise both pre-combustion and post-combustion gases and may further include oil, water vapor, etc.

The build up of blow-by gases within the crankcase and the attendant build up of gas pressure may cause damage to engine components such as seals and gaskets. Further, blow-by gases, which often include a mixture of unburned fuel and intake air, are typically corrosive. Thus, in order to maximize fuel efficiency, minimize the discharge of unburned fuel to the environment, and minimize damage caused by blow-by gas retention within the crankcase, it is known to ventilate the crankcase and re-circulate the blow-by gases to the intake side of the engine to be burned in the combustion chambers.

Positive crankcase ventilation (PCV) systems are used to ventilate the crankcase and re-circulate the blow-by gases to the intake side of the engine where these gases can be combined with fresh air entering via the air induction system. With respect to the gas pressure in the crankcase, a relative negative pressure in the air intake is typically used to draw blow-by gases out of crankcase and into the air intake.

An external conduit, such as a vent line issuing from the crankcase and connecting to an inlet port of a PCV channel, can be used to route the blow-by gases from the crankcase to the PCV channel which, in turn, distributes the gases into the air induction system. Preferably, the blow-by gases are uniformly introduced to the airflow and thus uniformly distributed to each of the engine's cylinders.

Gas flow from the crankcase can be regulated using a valve (i.e., a PCV valve) which opens when the gas pressure in the crankcase exceeds a predetermined value. Ideally, blow-by gases are removed from the crankcase at the same rate they enter without upsetting the fuel/air mixture for combustion.

Due to under-hood space limitations in most automobile applications, it would be advantageous to provide a positive crankcase ventilation (PCV) channel that is integrated into the construction of an air manifold. It would also be advantageous to provide a positive crankcase ventilation system having a minimal number of additional parts and/or a minimal number of manufacturing steps.

SUMMARY OF THE INVENTION

Accordingly, it is an object of the invention to provide a compact, efficient and cost-effective positive crankcase ventilation (PCV) system.

Another object of the invention is to provide an air intake manifold having incorporated therein a positive crankcase ventilation channel.

A further object of the invention is to provide a PCV system which facilitates uniform distribution of blow-by gases to each cylinder of an internal combustion engine.

These and other objects are achieved by a positive crankcase ventilation (PCV) channel that is integrated into a structural weld seam of an air intake manifold. Blow-by gases can be ported from the crankcase to the PCV channel where they can be uniformly mixed with the flow of air through the air induction system and distributed to respective combustion chambers. The apparatus of the invention has an advantage of lower manufacturing costs because no additional parts need to be produced. Specifically, the PCV channel is formed along a pre-existing structural weld line between two shells that are bonded together to form the air intake manifold.

These and other features of preferred embodiments of the invention, in addition to being set forth in the claims, are also disclosed in the specification and/or in the drawings, and the individual features each may be implemented in embodiments of the invention either individually or in the form of sub-combinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
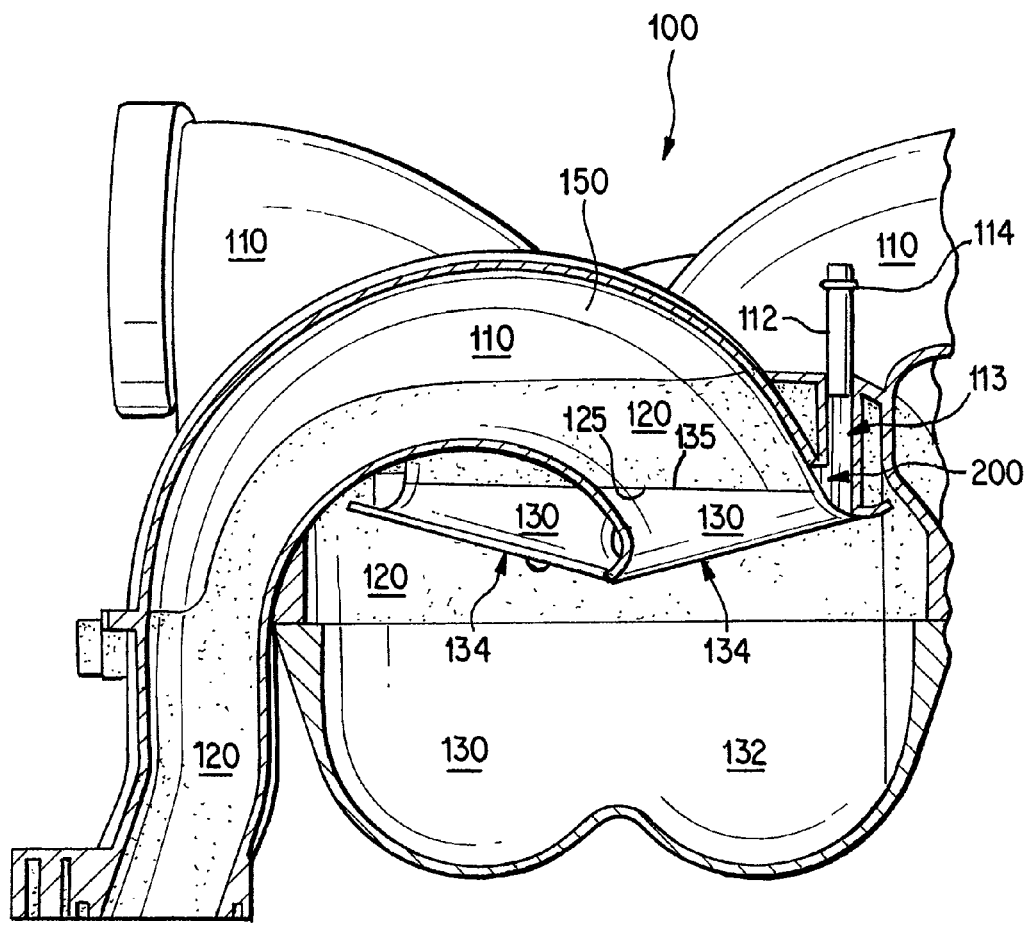
FIG. 1 is a sectional view of an air intake manifold according to one embodiment.

FIG. 1 shows a sectional view of an air intake manifold 100 according to one embodiment of the invention. The air intake manifold 100 includes an intake plenum 132, which distributes intake air to intake channels 150 that are aligned with intake ports in an engine cylinder head (not shown). Intake air flows from the plenum 132 into intake channels 150 via bell mouth openings 134. Such an air intake manifold may be designed for an in-line or V-type cylinder arrangement, or for any other type of arrangement of the cylinders.

The air intake manifold is fabricated using a multi-shell construction and comprises a first shell 110, a second shell 120, and a third shell 130. In one embodiment, the first shell is an upper shell, the second shell is a middle shell, and the third shell is a lower shell. Respective mating pairs of the shells can be bonded together along respective interfaces to form the air intake manifold using a welding process such as vibrational welding. Each of the first, second, and third shells can be made, for example, of a synthetic resin material or of a light metal such as aluminum or an alloy of aluminum. A suitable process for forming the shells is injection molding.

As illustrated, a PCV channel inlet tube 112 is formed in first shell 110. The inlet tube 112 includes a bulge or rib 114 at a distal end thereof for attaching a hose or other conduit thereto using, for example, a hose clamp. In an assembled air intake manifold, the PCV channel inlet tube is in fluid communication with an integrated PCV channel. As explained in further detail below, blow-by gases can flow from the crankcase via the conduit, and then, sequentially, through the PCV channel inlet tube 112, the integrated PCV channel 200, the intake channels 150, and ultimately to the combustion chambers.

Figure 2:
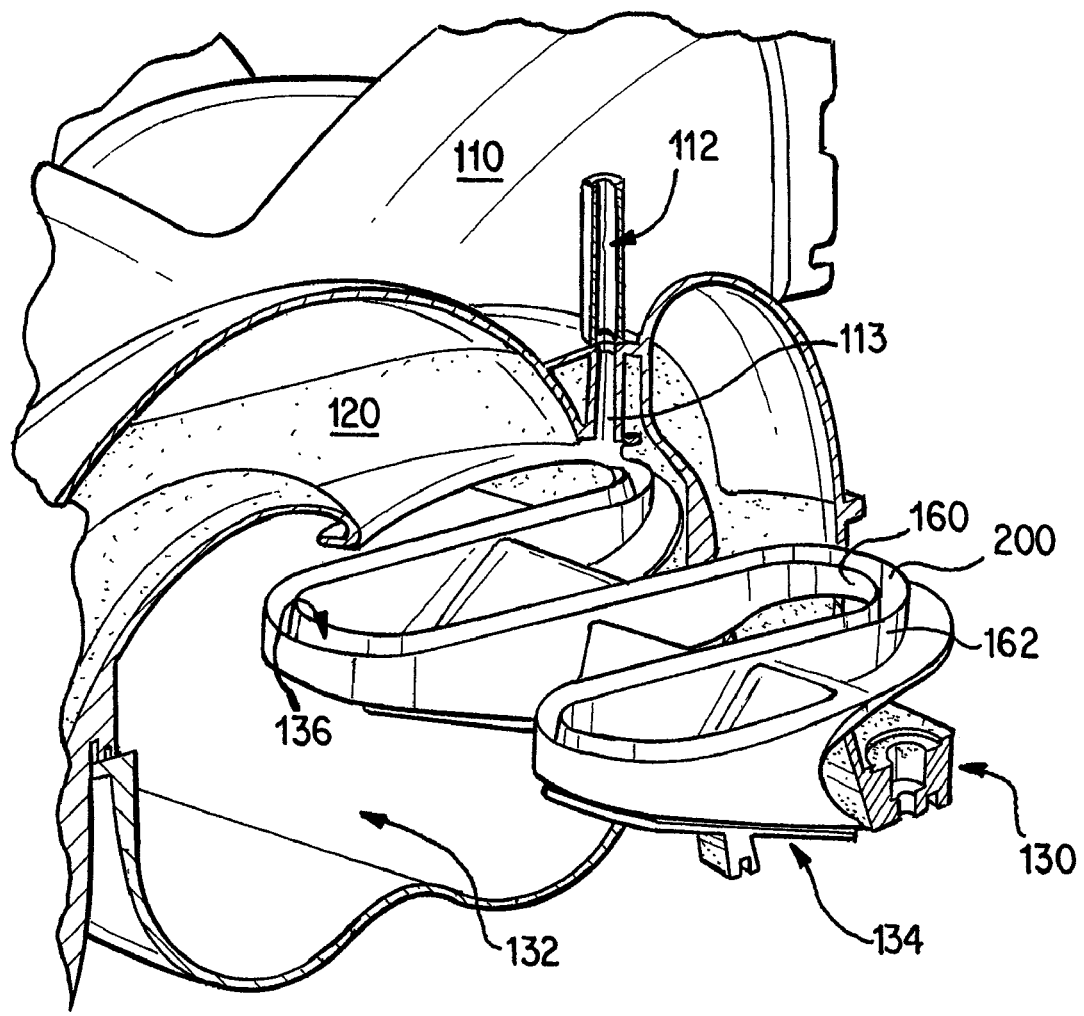
FIG. 2 is a perspective cut-away view of the air intake manifold shown in FIG. 1.

The construction of the integrated PCV channel will be described next with reference to FIGS. 1-3, and specifically second and third shells 120, 130 of the air intake manifold 100. The second shell 120 and the third shell 130 each comprise an interface 125,135, respectively, along which these two shells can be bonded together. Formed along each of the two respective interfaces of the second and third shells are grooves 126 (FIG. 3) and 136 (FIG. 2). Each groove comprises a first wall 160 and a second wall 162. In a preferred embodiment, each groove has a substantially semicircular cross section. Alternatively, the cross section of the grooves can be square, rectangular, or oval.

When the second and third shells are bonded together, groove 126 formed in second shell 120 and groove 136 formed in third shell 130 cooperate to define integrated PCV channel 200. The integrated PCV channel is one continuous channel that, as illustrated in FIGS. 2 and 3, can have a serpentine "S" shape due to the shape of the bonding interface between the second and third shells. However, it is to be understood that the shape of the path of the integrated PCV channel may vary with the specific geometry of the air intake manifold. An important aspect of the invention is that the integrated PCV channel is formed along a pre-existing structural weld line that is used to assemble the air intake manifold.

A perspective view of air intake manifold 100 is shown in FIG. 2. As illustrated, inlet tube 112 is in fluid communication with the integrated PCV channel 200 and comprises an inlet 113 located near one end of the integrated PCV channel. Thus, blow-by gases that are introduced into the integrated PCV channel 200 via the inlet tube 112 flow substantially in one direction through the integrated PCV channel.

In an alternate embodiment, the inlet 113 of the inlet tube 112 can be located away from one end of the integrated PCV channel 200. In this alternate embodiment, blow-by gases entering the integrated PCV channel can flow in either of two different directions through the integrated PCV channel.

Still referring to FIG. 2, in the foreground, first and second shells 110,120 are cut-away so that bell mouth openings 134 and one half of the integrated PCV channel 200 can be clearly seen. In FIG. 2, groove 136, which is formed in third shell 130, is visible.

Blow-by gases flowing through the integrated PCV channel 200 exit the integrated PCV channel via a plurality of apertures 210 that are formed along the channel. As shown with reference to FIG. 3, a plurality of notches 220 are formed along the integrated PCV channel 200 in the second shell 120 such that when the second shell is bonded to the third shell 130, each notch 220 defines an aperture 210. Thus, the apertures are located at the interface between mating shells. In order for the integrated PCV channel to be in fluid communication with the intake channels 150, the notches are formed in a wall of the groove that lies adjacent a respective intake channel.

Figure 3:
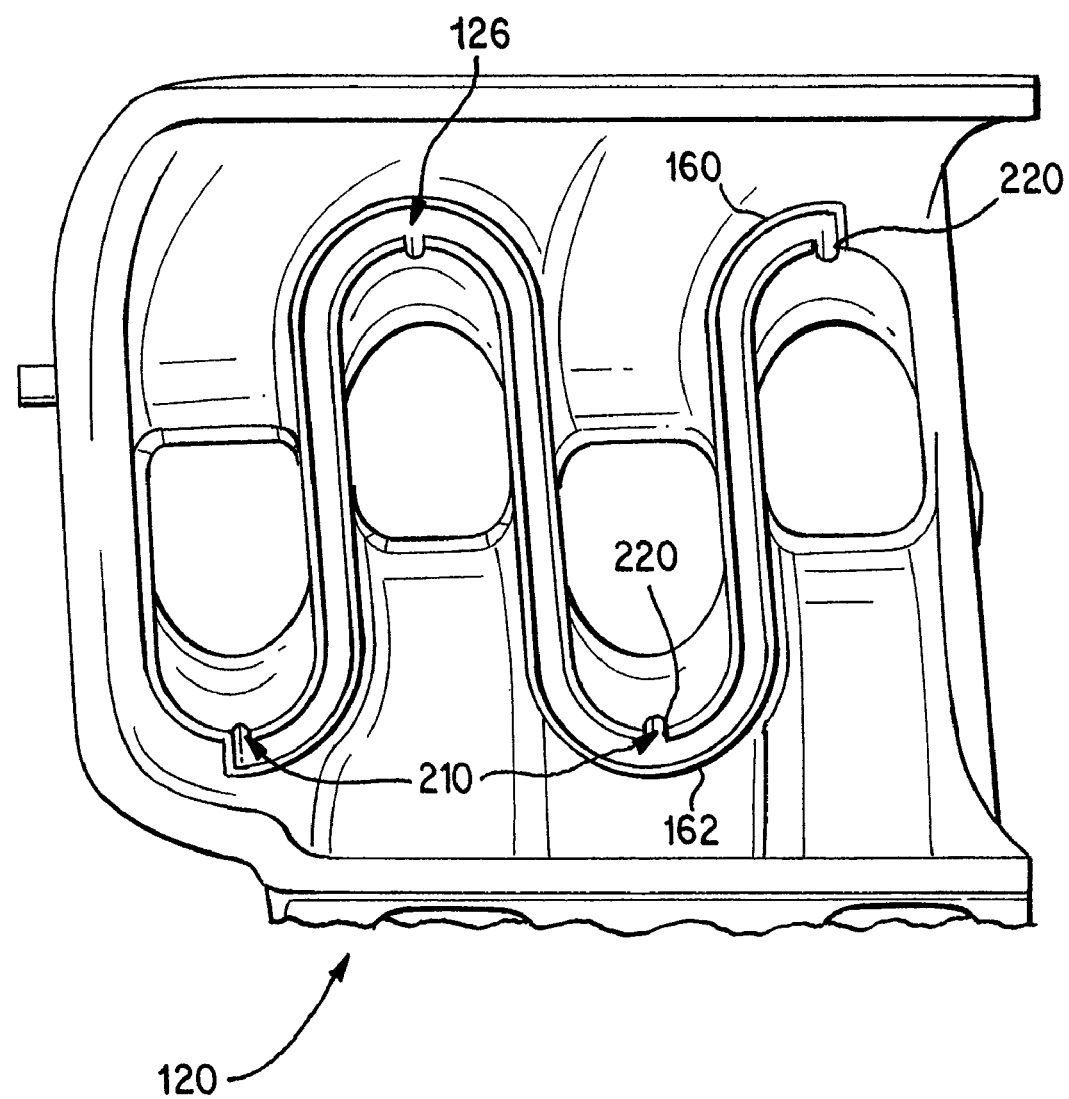
FIG. 3 shows a PCV channel formed in a second shell section of an air intake manifold.

The FIG. 3 embodiment shows notches formed in the second shell 120. It is to be understood, however, that the aperture-defining notches can be formed in either or both of the mating shells (e.g., second and/or third shells) that define the integrated PCV channel. Further, in embodiments where notches are formed in both shells, notches formed in one shell can optionally be arranged to align with notches formed in the mating shell such that the area of the aperture formed by the aligned notches is greater than the area formed by either of the two notches individually.

As seen in FIG. 1, the assembled first and second shells 110, 120 define intake channels 150, and the third shell 130 comprises the bell mouth openings 134 of the intake channels 150. The integrated PCV channel 200 is formed immediately adjacent the bell mouth openings 134, which defines the "S" shape of the channel. With such a construction, the blow-by gases can be advantageously introduced into the inlet air flow in the vicinity of the bell mouth openings 134. This allows the blow-by gases and fresh inlet gases to mix and equilibrate prior to reaching the combustion chambers.

Though only one aperture per intake channel is illustrated, one or more apertures per intake channel can be provided. In a similar vein, while the apertures are shown positioned symmetrically with respect to the radius of curvature of the integrated PCV channel, the location of the apertures is not so limited. In one alternate embodiment, a plurality of apertures can be equally or unequally spaced along the integrated PCV channel.

As noted above, blow-by gases enter the integrated PCV channel from the inlet 113 of the inlet tube 112 and exit via apertures 210. Thus, as blow-by gases flow through the integrated PCV channel, the gases may exit the channel via an aperture, or continue to flow through the integrated PCV channel and exit via a subsequent, downstream aperture. In order to account for this linear flow geometry and achieve a substantially uniform distribution of blow-by gases in the combustion chambers, according to one embodiment, the areal dimension of the apertures increases as a function of distance from the inlet tube. By configuring the area of the apertures in this manner, the distribution of blow-by gases to the intake channels 150 can be approximately independent of the location of aperture within the integrated PCV channel. As an example, the area of each successive downstream aperture can be from about 1 to 50%, more preferably from about 2 to 10%, greater than the preceding, upstream aperture.

While the invention has been described with reference to an air intake manifold constructed of three shells, it will be appreciated that the integrated PCV channel can be formed along the weld line of an air intake manifold comprising two or more shells. For example, in an alternate embodiment, the air intake manifold can be constructed using only two shells. In this embodiment, a first shell comprises both the inlet tube and the first groove, while the second shell comprises the second groove.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An air intake manifold having an integrated PCV channel, the air intake manifold being formed from a plurality of mating shell pieces that are bonded together along respective mating interfaces and comprising:
   at least one air inlet leading to a plenum;
   a plurality of air intake channels leading from the plenum to respective cylinders of an engine; and
   an integrated PCV channel in fluid communication with each of the air intake channels,
   wherein the integrated PCV channel is a groove formed in its entirety within walls defining said air intake channels, said groove formed along a structural weld line between two mating shell pieces that are bonded together to form the air intake manifold.

2. The air intake manifold of claim 1, wherein said plurality of shell pieces comprise
   a first shell piece having formed therein an inlet tube that is in fluid communication with the integrated PCV channel, and
   second and third mating shell pieces having mating interfaces which define said integrated PCV channel.

3. The air intake manifold of claim 2, wherein the inlet tube is provided near one end of the integrated PCV channel such that gases flowing into the integrated PCV channel from the inlet tube flow substantially in one direction through the integrated PCV channel.

4. The air intake manifold of claim 2, wherein the inlet tube is provided away from one end of the integrated PCV channel such that gases flowing into the integrated PCV channel from the inlet tube flow substantially in two different directions through the integrated PCV channel.

5. The air intake manifold of claim 1, wherein grooves are formed in each of the respective mating interfaces of the two mating shell pieces, said grooves cooperating to define the integrated PCV channel when the two mating shell pieces are bonded together.

6. The air intake manifold of claim 5, wherein at least one of the grooves comprises a plurality of apertures formed in a groove wall adjacent an intake channel such that the integrated PCV channel is in fluid communication with the plurality of air intake channels via said plurality of apertures.

7. The air intake manifold of claim 6, wherein a plurality of notches are formed in the groove wall of the at least one groove, each aperture being defined by a respective notch.

8. The air intake manifold of claim 5, wherein each of the grooves comprises a plurality of apertures formed in a groove wall adjacent respective ones of said intake channels such that the integrated PCV channel is in fluid communication with the plurality of air intake channels via said plurality of apertures.

9. The air intake manifold of claim 8, wherein a plurality of notches are formed in the groove wall of each groove, each aperture being defined by a respective notch.

10. The air intake manifold of claim 9, wherein the notches formed in one shell piece align with the notches formed in the other shell piece when the two mating shell pieces are bonded together.

11. The air intake manifold of claim 1, wherein blow-by gases are introduced from the integrated PCV channel into an intake channel in a vicinity of a bell mouth opening formed in the air intake manifold.

12. The air intake manifold of claim 6, wherein the integrated PCV channel comprises more than one aperture per intake channel.

13. The air intake manifold of claim 6, wherein the apertures are equally spaced along the integrated PCV channel.

14. The air intake manifold of claim 6, where the areal dimension of the apertures increases as a function of distance from the inlet tube.

15. The air intake manifold of claim 6, wherein each groove has a substantially semicircular cross section.

16. The air intake manifold of claim 8, wherein the apertures are equally spaced along the integrated PCV channel.

17. The air intake manifold of claim 8, where the areal dimension of the apertures increases as a function of distance from the inlet tube.

18. The air intake manifold of claim 8, wherein each groove has a substantially semicircular cross section.

* * * * *